Figure 5:
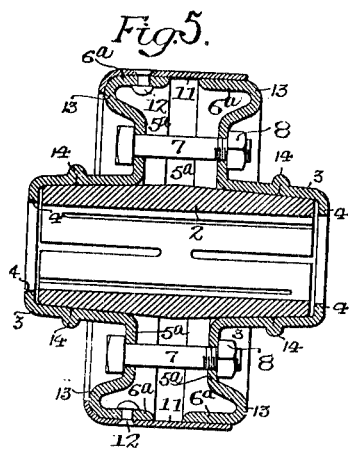

H. T. HALLOWELL.
SHAFT COUPLING.
APPLICATION FILED MAR. 16, 1909.
1,107,606.
Patented Aug. 18, 1914.
2 SHEETS—SHEET 1.
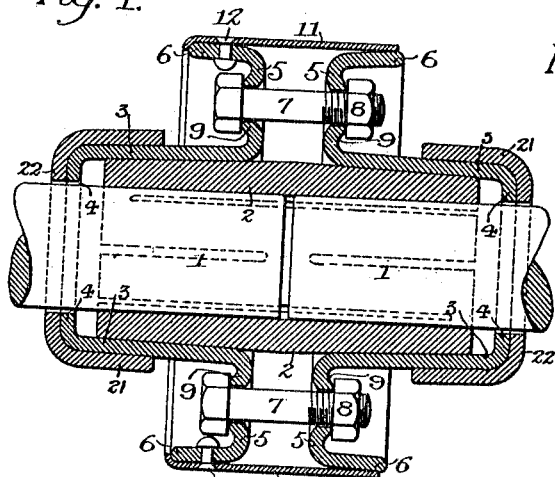
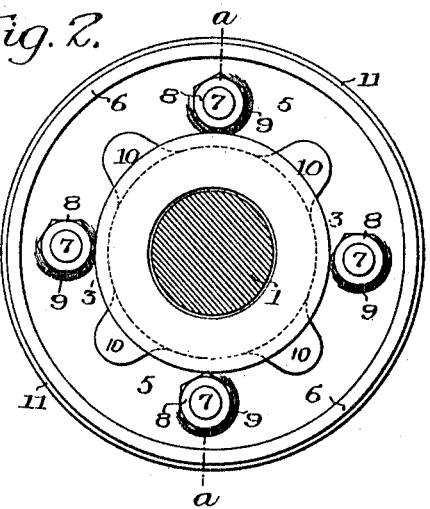
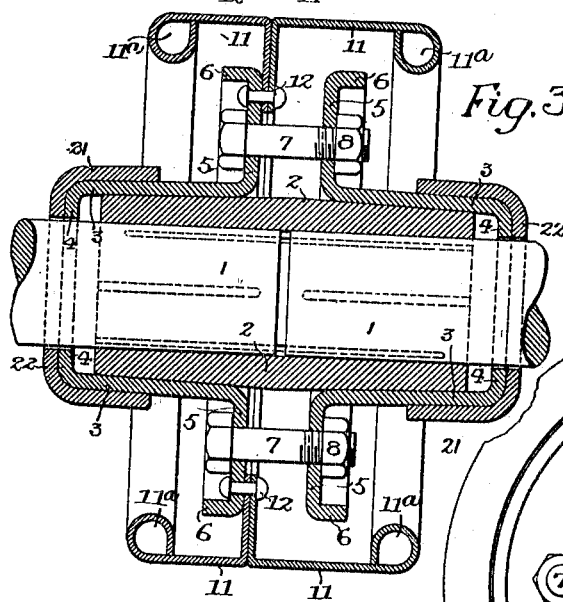
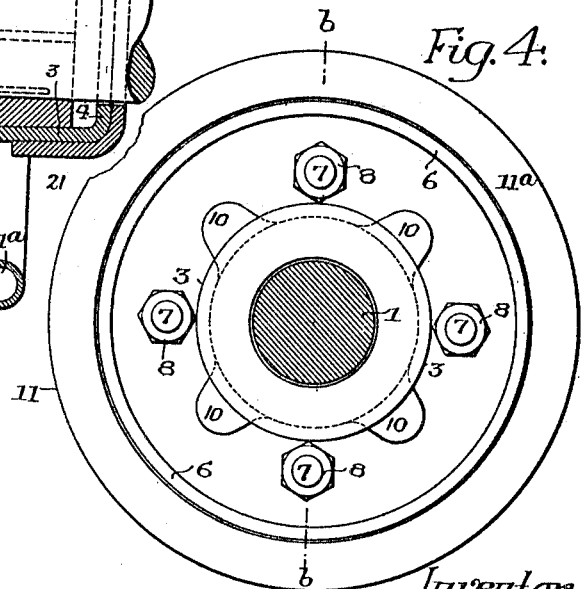
Witnesses—
Willa A. Burrows
Walter R. Pullinger
Inventor:
Howard T. Hallowell.
by his Attorneys—
Howson & Howson

H. T. HALLOWELL.
SHAFT COUPLING.
APPLICATION FILED MAR. 16, 1909.

1,107,606.

Patented Aug. 18, 1914.
2 SHEETS—SHEET 2.

Witnesses:
Wills A. Burrowes
Walter F. Pullinger

Inventor:
Howard T. Hallowell,
by his Attorneys
Howson & Howson

UNITED STATES PATENT OFFICE.

HOWARD T. HALLOWELL, OF PHILADELPHIA, PENNSYLVANIA.

SHAFT-COUPLING.

1,107,606.   Specification of Letters Patent.   Patented Aug. 18, 1914.

Application filed March 16, 1909. Serial No. 483,805.

*To all whom it may concern:*

Be it known that I, HOWARD T. HALLOWELL, a citizen of the United States, residing in Philadelphia, Pennsylvania, have invented certain Improvements in Shaft-Couplings, of which the following is a specification.

My invention relates to shaft couplings, and the object of my invention is to provide a shaft coupling of sheet metal, equal, and in some respects greater, in efficiency than the usual cast metal structures, and materially cheaper than the same.

A further feature of my invention is the improved method or process of producing the sections or shells comprising the coupling.

A still further object of my invention is to provide the sheet metal coupling with an annular cover designed to inclose the same and bridge the space between the flanges of the shells; such cover serving to prevent accidents to workmen, and at the same time rendering the coupling capable of use as a pulley.

Other features of my invention will be more fully referred to hereinafter, reference being had to the accompanying drawings, in which:

Figure 1, is a sectional elevation on the line $a$—$a$, Fig. 2, illustrating one form of shaft coupling embodying my invention; Fig. 2, is an end elevation of the structure shown in Fig. 1; Fig. 3, is a sectional elevation, similar to Fig. 1, on the line $b$—$b$, Fig. 4, showing another form of shaft coupling embodying my invention; Fig. 4, is an end elevation of the structure shown in Fig. 3, and Figs. 5, 6, 7 and 8, are sectional views illustrating shaft couplings embodying my invention, in which the hubs of the shells have flanged ends extending over the sleeve or bushing embracing the meeting ends of the shafts.

In the drawings herewith, 1, 1, represent the meeting ends of the shafts to be coupled, and 2 a sleeve or bushing for the same, which sleeve may be of any approved type; preferably, however, one that has a tapered outer wall with its body split or otherwise constructed so as to be capable of compression against the shaft ends, although my invention does not relate in any manner to the form of sleeve or bushing with which my coupling may be employed.

To clamp the sleeve or bushing to the meeting ends of the shafts, I provide flanged members or shells of substantially the same contour, which are made of sheet metal pressed into shape; each of the flanged members shown in Figs. 1 and 3, having a cup 3 forming a hub with an end flange 4 disposed beyond the ends of the sleeve or collar 2 and just out of contact with the shaft, and an annular flange or wall 5 surrounding the cup, to which flange or wall the coupling means are connected; said annular flanges or walls 5 terminating in peripheral flanges or guard walls 6 substantially parallel to the cups embracing the sleeve or bushing 2. The flanges 4 serve as strengthening or reinforcing means for the hubs of the coupling and resist any tendency of said hubs to split when drawn toward each other over the tapered walls of the sleeve or bushing, and at the same time they act as guards for the connecting means.

Means for connecting the flanges or walls 5 of the coupling and serving also to draw the hubs of the coupling over the ends of the sleeve or bushing, comprise bolts 7 having suitable nuts 8, and to strengthen these parts of the coupling structure, the annular walls or flanges 5 are provided with struck-up portions 9, which are apertured to receive the bolts. Compression strains due to taking up on said bolts in drawing the sections of the coupling together come directly against this reinforced portion. The cups or hubs 3 may be further strengthened by ribs 10 struck up and disposed diagonally with respect to the annular flanges 5, as clearly indicated in Figs. 2 and 4.

To span the space between the outer peripheral walls 6 of the flanges 5 of the structure, and form an additional guard, an annular band or sheet of lighter metal may be provided, as indicated at 11; said band being suitably secured to one of the outer peripheral walls of said sections, and, as indicated at 12, rivets may be employed for the purpose. This band serves the double purpose of closing the gap between the flanges 5 preventing all danger of a workman's clothing being caught therein, and at the same time forming a pulley by which a belt may be driven.

The structure shown in Figs. 3 and 4, is slightly different than that shown in Figs. 1 and 2, in that the peripheral walls 6, serving as strengthening means, are narrower. In this structure the rim or band 11 is in two pieces, both of which may be riveted to one of the flanges 5 of the structure. In this instance the rim or guard 11 may have its marginal edges turned over as indicated at 11ª.

In Fig. 5, I have shown a structure in which annular flanges or walls 5ª of the coupling members and having the hubs 3, are provided with inwardly projecting peripheral walls or flanges 6ª, and the space between such flanges is spanned by an annular band 11, forming a rim or guard, which may be riveted at 12 to one of said flanges 6ª. The band 11 may be turned over against one of the flanges or walls 5ª, and in this instance the rolled portions 13 of the walls 5ª serve as guards for the bolts and nuts. In this structure also, the cups 3 forming the hubs may be provided with a reinforcing rib 14.

Figure 6:
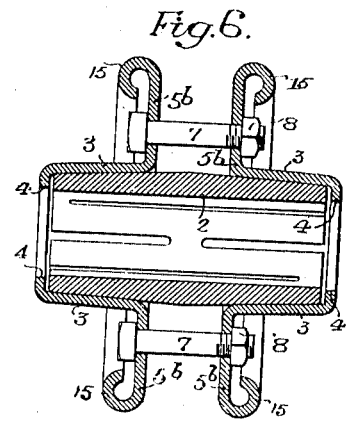

In the structure shown in Fig. 6, the annular walls or flanges 5ᵇ of the coupling members have outwardly turned or rolled edges 15 which serve to strengthen said walls and also act as guards.

Figures 7, 8:
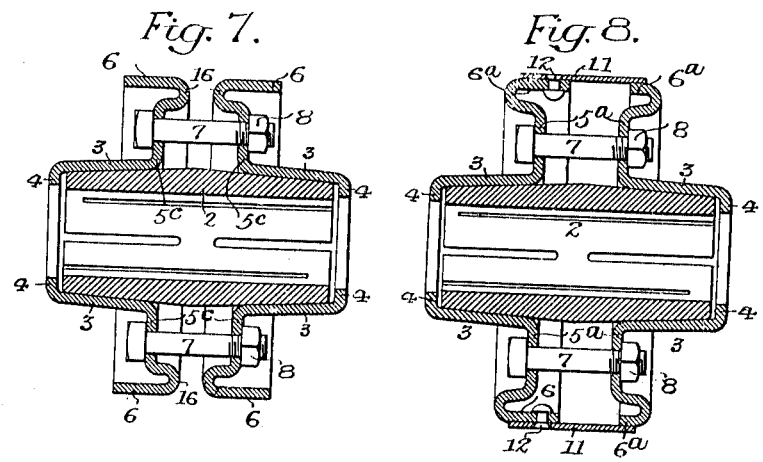

In the structure shown in Fig. 7, the coupling members have annular walls or flanges 5ᶜ with inwardly offset annular portions 16 which are again turned outwardly to form annular or peripheral walls 6 which serve as guarding means for the coupling and also as a pulley rim.

The structure shown in Fig. 8, is substantially the same as that shown in Fig. 5, except that the peripheral wall 6ª of one of the sections is shorter than the other. The peripheral wall of the other shell carries an annular band 11, which may be riveted thereto at 12, or otherwise secured to the same to serve as a guard, or pulley rim.

In the structures shown in Figs. 1 to 8, both inclusive, the cup members or hubs 3, are provided with reinforcing means in the shape of the inwardly turned flanges 4 which inclose the ends of the sleeve or bushing 2. In addition, in the forms of coupling shown in Figs. 1 and 3, I provide a supplemental cap or hub 21, which may be shrunk onto the hub 3, and may be provided with a flange 22 overlying the flange 4.

The structure shown in Figs. 5 to 8, inclusive, have their coupling members secured together by the bolts 7 and nuts 8, in the same manner as the structure shown in Figs. 1 and 3.

All of the structures forming the subject of my invention are made of sheet metal pressed into shape, one thickness being employed for the coupling shells, while another and lighter weight is preferably employed for the guards or pulley rims. The coupling sleeve may be of any approved type having a tapering exterior for engagement by the walls of the coupling shells.

The imporved method or process of making my improved shaft coupling embodies the following steps: From sheet metal, preferably sheet steel of the desired gage and temper, and of such a character as to draw readily, I cut circular blanks of a size sufficient to form one of the halves of my improved coupling. These blanks are then placed in suitable dies which form them into cup-shaped members by a drawing action; the margin of said blank being held while the central cup-shaped portion is formed. The next action is to turn the edges of the marginal flanges to form strengthening flanges disposed substantially parallel with the cup-shaped ends from which the hubs are formed. The blank is then placed in a cup-shaped die having tapered walls and a tapered plug is driven into the blank to give the hub smooth finished sides and surfaces. I then form apertures for the passage of securing means, such as bolts, in the marginal flange of the coupling members and pierce or cut the bottom of the cup-shaped portion or hub for the passage of the shaft when the structure is in use, and simultaneously with the formation of the bolt holes I press up the web of metal to form bosses and add strength to the said flange.

I claim:—

1. In a shaft coupling, the combination with a compressible sleeve receiving shaft ends to be coupled, of a pair of pressed-metal members having tapering hubs embracing the ends of said sleeve and outwardly extending walls at right angles to the axis of said hubs forming bolt receiving portions parallel with each other, said hubs having inwardly extending flanges adjacent the ends of the sleeve, said walls terminating outwardly with flanges or rims forming stiffening elements disposed substantially at right angles thereto, and means for connecting said walls.

2. In a shaft coupling, the combination with a compressible sleeve or bushing receiving shaft ends to be coupled and having tapering external walls, of a plurality of separate pressed sheet-metal clamping elements fitted thereon, each of said elements having a web or disk portion lying at right angles to the axis of the shaft, a tapering hub portion integral with said web and having a rounded contour at the junction of said parts, a flanged rim at the outer annular edge of said web, and a stiffening flange at the end of the hub portion, and means for confining said clamping elements together and in engagement with said compressible sleeve or bushing.

3. In a shaft coupling, the combination with a compressible sleeve or bushing receiving shaft ends to be coupled, said bushing having tapered ends, of a plurality of separate pressed sheet metal clamping elements fitted thereon, said elements having web or disk portions lying at right angles to the axis of the shaft, tapering hub portions integral with said webs and having a rounded contour at the junction of said parts, annular flanged rims carried by said webs, and stiffening flanges at the smaller ends of the hub portions, the web or disk portions of said clamping elements having reinforcing and strengthening means, and means for confining said clamping elements together with their hubs in engagement with said compressible sleeve or bushing.

In testimony whereof, I have signed my name to this specification, in the presence of two subscribing witnesses.

HOWARD T. HALLOWELL.

Witnesses:
MURRAY C. BOYER,
WM. A. BARR.

Copies of this patent may be obtained for five cents each, by addressing the "Commissioner of Patents. Washington, D. C."